United States Patent
Helvick et al.

(10) Patent No.: US 9,699,722 B2
(45) Date of Patent: Jul. 4, 2017

(54) SYSTEMS AND METHODS FOR WIRELESS POWER MANAGEMENT

(71) Applicant: Sharp Laboratories of America, Inc., Camas, WA (US)

(72) Inventors: Richard Eric Helvick, Portland, OR (US); Edward Masami Sugiyama, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 124 days.

(21) Appl. No.: 14/318,484

(22) Filed: Jun. 27, 2014

(65) Prior Publication Data
US 2015/0382291 A1  Dec. 31, 2015

(51) Int. Cl.
*H04W 52/02* (2009.01)
*H04W 64/00* (2009.01)
*H04W 76/04* (2009.01)

(52) U.S. Cl.
CPC ...... *H04W 52/0206* (2013.01); *H04W 64/006* (2013.01); *H04W 76/048* (2013.01); *Y02B 60/50* (2013.01)

(58) Field of Classification Search
CPC ......... H04W 52/0235; H04W 52/0206; H04W 76/048; H04W 64/006
See application file for complete search history.

(56) References Cited

U.S. PATENT DOCUMENTS

| 8,194,576 B2 | 6/2012 | Kholaif et al. | |
| 2007/0066329 A1* | 3/2007 | Laroia | H04B 7/2678 455/502 |
| 2008/0234930 A1* | 9/2008 | Cheok | G01S 5/0289 701/408 |
| 2010/0056184 A1* | 3/2010 | Vakil | H04W 4/02 455/456.5 |
| 2011/0170466 A1* | 7/2011 | Kwun | H04W 52/0235 370/311 |
| 2011/0182213 A1* | 7/2011 | Forssell | H04W 52/0235 370/277 |
| 2012/0026925 A1 | 2/2012 | Vempati | |
| 2012/0033611 A1* | 2/2012 | Wu | H04W 24/02 370/328 |
| 2012/0106349 A1* | 5/2012 | Adjakple | H04W 52/0206 370/241 |
| 2012/0106423 A1* | 5/2012 | Nylander | H04W 52/0241 370/311 |
| 2012/0157002 A1* | 6/2012 | Choi | H04W 52/0206 455/67.11 |
| 2013/0272285 A1 | 10/2013 | Goldsmith et al. | |
| 2014/0071877 A1* | 3/2014 | Akiyoshi | H04W 52/0206 370/311 |

(Continued)

*Primary Examiner* — Ricky Ngo
*Assistant Examiner* — Michael Phillips
(74) *Attorney, Agent, or Firm* — Austin Rapp

(57) ABSTRACT

A wireless access point is described. The wireless access point includes a processor, memory and instructions stored in the memory. The wireless access point receives a sleep state command from a central controller. The central controller transmits the sleep state command based on movement of an electronic device in relation to one or more wireless access points located within a wireless network. The wireless access point enters a sleep state for a sleep period. The wireless access point transitions to an active state upon expiration of the sleep period.

31 Claims, 12 Drawing Sheets

(56) References Cited

U.S. PATENT DOCUMENTS

| | | | | |
|---|---|---|---|---|
| 2014/0107919 A1* | 4/2014 | Venkatraman | .......... | G01S 19/48 |
| | | | | 701/466 |
| 2014/0348143 A1* | 11/2014 | Kato | ................. | H04W 52/0206 |
| | | | | 370/336 |
| 2015/0163744 A1* | 6/2015 | Suh | ................... | H04W 52/0235 |
| | | | | 370/311 |
| 2015/0327043 A1* | 11/2015 | Das | ....................... | H04W 8/005 |
| | | | | 455/418 |
| 2015/0358923 A1* | 12/2015 | Teng | .................... | H04W 52/28 |
| | | | | 455/522 |

* cited by examiner

SYSTEMS AND METHODS FOR WIRELESS POWER MANAGEMENT

TECHNICAL FIELD

The present disclosure relates generally to wireless communication. More specifically, the present disclosure relates to systems and methods for wireless power management.

BACKGROUND

The use of electronic devices has become commonplace in modern society. Electronic devices have become smaller and more powerful in order to meet consumer needs and to improve portability and convenience. Electronic devices that are commonly used include computing devices, such as personal computers or laptops. Other electronic devices commonly used include cellular phones, smart phones, personal digital assistants, tablet devices, netbooks, e-readers, global positioning satellite (GPS) units, etc. Consumers have become dependent upon electronic devices and have come to expect increased functionality.

One way functionality of electronic devices has increased is through the use of wireless communication. Wireless communication allows several electronic devices to simultaneously communicate with a base station or other servicing device. Wireless communication allows more flexibility of where and when an electronic device can access a network.

As wireless communication devices have advanced, improvements in communication capacity, speed, flexibility and/or efficiency have been sought. However, improving communication capacity, speed, flexibility and/or efficiency may present certain problems. For example, wireless communication devices may communicate with one or more wireless access points in a network. However, the wireless access point may not always have a wireless communication device using the wireless access point. This causes unnecessary consumption of power. As illustrated by this discussion. Systems and methods that improve wireless power management may be beneficial.

DETAILED DESCRIPTION

Figure 1:
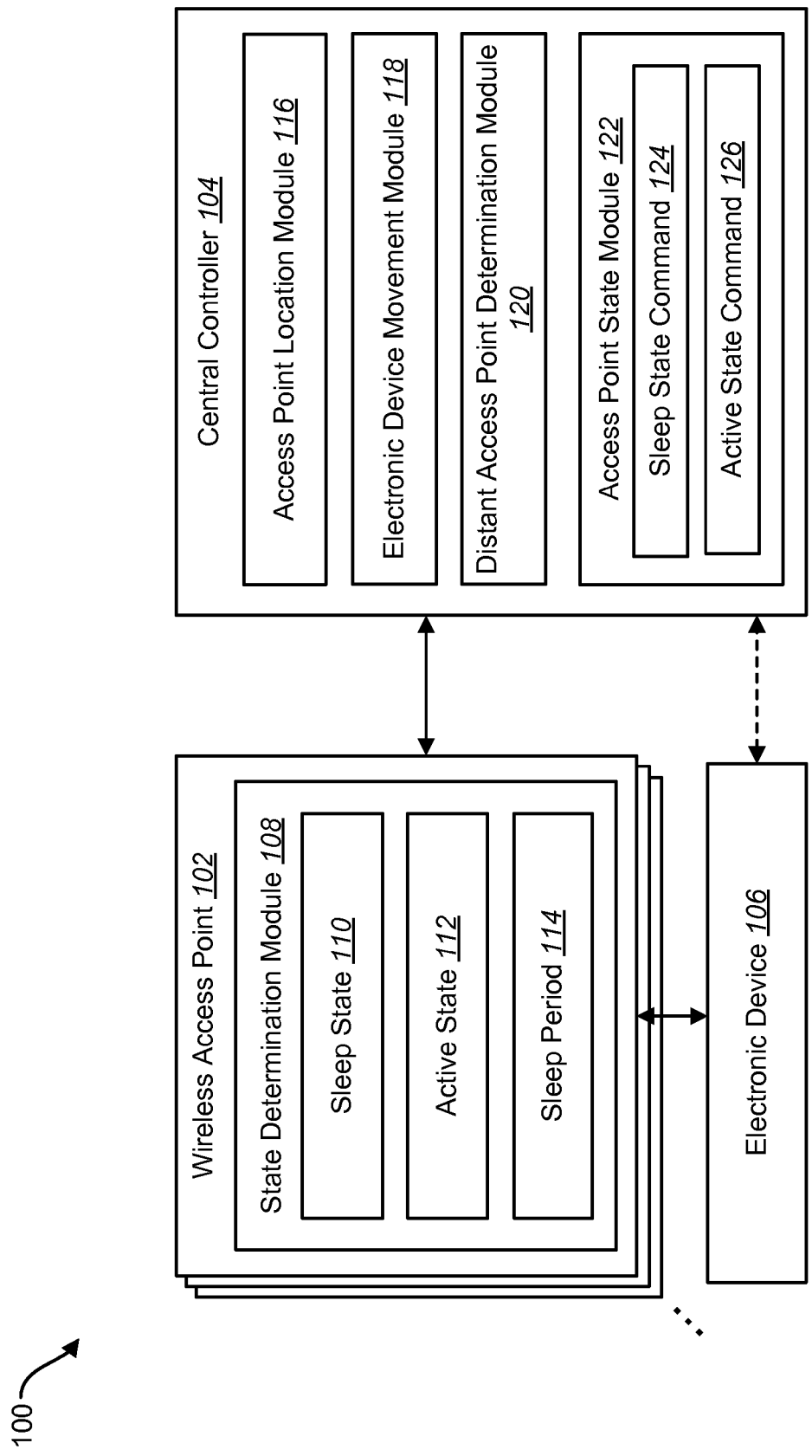
FIG. 1 is a block diagram illustrating a configuration of a wireless network that includes one or more wireless access points, a central controller and an electronic device.

A wireless access point is disclosed. The wireless access point comprises a processor, memory in electronic communication with the processor and instructions stored in the memory. The instructions receive a sleep state command from a central controller. The central controller transmits the sleep state command based on movement of an electronic device in relation to one or more wireless access points located within a wireless network. A sleep state is entered for a sleep period. An active state is transitioned to upon expiration of the sleep period.

The wireless access point may check for an active state command upon expiration of the sleep period. The active state command may instruct the wireless access point to transition to the active state. The wireless access point may activate a backhaul radio and check for the active state command. If the active state command is received, the wireless access point may transition to the active state. The wireless access point may receive a backhaul signal that includes an active state command. If the active state command is received, the wireless access point may transition to the active state.

The movement of the electronic device may be determined based on connections of the electronic device to one or more wireless access points in the wireless network. The movement of the electronic device may be determined based on a preprogrammed route. The movement of the electronic device may be determined based on movement update data from the electronic device. The movement of the electronic device may be determined based on global positioning (GPS) data.

During the active state, a main radio may be active, a backhaul radio may be active and a sleep timer may be inactive. During a sleep state a main radio may be inactive, a backhaul radio may be inactive and a sleep timer may be active. During the active state a main radio may be active and a sleep timer may be inactive. During a sleep state a main radio may inactive and a sleep timer may be active.

A central controller is disclosed. The central controller comprises a processor, memory in electronic communication with the processor and instructions stored in the memory. The instructions determine a location of one or more wireless access points in a wireless network. Movement of an electronic device is determined within the wireless network. One or more distant wireless access points are determined based on the movement of the electronic device. A sleep state command is transmitted to the one or more distant wireless access points.

An active state command may be transmitted to one or more near wireless access points based on the movement of the electronic device. The movement of the electronic device may be determined based on connections of the electronic device to one or more wireless access points in the wireless network. The movement of the electronic device may be determined based on a preprogrammed route. Movement update data may be received from the electronic device. The movement of the electronic device may be determined based on the movement update data. The movement of the electronic device may be determined based on global positioning system (GPS) data. The one or more distant wireless access points may be determined based on the location of the one or more wireless access points and the movement of the electronic device.

A method for power management by a wireless access point is disclosed. A sleep command is received from a central controller. The central controller transmits the sleep state command based on movement of an electronic device in relation to one or more wireless access points located within a wireless network. A sleep is entered for a sleep period. An active state is transitioned to upon expiration of the sleep period.

An active state command may be checked for upon expiration of the sleep period. The active state command may instruct the wireless access point to transition to an active state. A backhaul radio may be active and check for the active state command. If the active state command is received, the wireless access point may transition to the active state. A backhaul signal may be received that includes an active state command. If the active state command is received, the wireless access point may transition the active state.

The movement of the electronic device may be determined based on connections of the electronic device to one or more wireless access points in the wireless network. The movement of the electronic device may be determined based on a preprogrammed route. The movement of the electronic device may be determined based on movement update data from the electronic device. The movement of the electronic device may be determined based on global positioning (GPS) data.

During the active state, a main radio may be active, a backhaul radio may be active and a sleep timer may be inactive. During a sleep state a main radio may be inactive, a backhaul radio may be inactive and a sleep timer may be active. During the active state a main radio may be active and a sleep timer may be inactive. During a sleep state a main radio may inactive and a sleep timer may be active.

A method for power management by a central controller is disclosed. A location of one or more wireless access points is determined in a wireless network. Movement of an electronic device is determined within the wireless network. One or more distant wireless access points are determined based on the movement of the electronic device. A sleep command is transmitted to one or more distant wireless access points.

An active state command may be transmitted to one or more near wireless access points based on the movement of the electronic device. The movement of the electronic device may be determined based on connections of the electronic device to one or more wireless access points in the wireless network. The movement of the electronic device may be determined based on a preprogrammed route. The movement of the electronic device may be determined based on global positioning system (GPS) data. The one or more distant wireless access points may be determined based on the location of the one or more wireless access points and the movement of the electronic device.

Various examples of the systems and methods disclosed herein are now described with reference to the figures, where like reference numbers may indicate functionally similar elements. The systems and methods as generally described and illustrated in the figures herein could be arranged and designed in a wide variety of different implementations. Thus, the following more detailed description of several implementations, as represented in the figures, is not intended to limit scope, as claimed, but is merely representative of the systems and methods.

FIG. 1 is a block diagram illustrating a configuration of a wireless network 100 that includes one or more wireless access points 102, a central controller 104 and an electronic device 106. A wireless access point 102 is a device that may communicate with several electronic devices 106 simultaneously through a wireless network 100. The wireless access point 102 may be located remotely. The wireless network 100 may be a mesh network where data may be relayed by nodes located within the wireless network 100. The wireless access point 102 may access the wireless network 100 through Wi-Fi (e.g. 802.11).

While one electronic device 106 is depicted in FIG. 1 for clarity, multiple electronic devices 106 may be included. In some configurations the wireless access points 102 may connect to an electronic device 106 that is mobile and may require a large area to be covered by wireless access points 102. This configuration may be used with an autonomous security vehicle (ASV) or other types of unmanned vehicles to cover a large area using the wireless access points 102.

The electronic device 106 may be any electronic device 106 capable of wireless communication. In one configuration, the electronic device 106 may be stationary and only needing access to the wireless network 100 periodically. In another configuration the electronic device 106 may be a mobile device that may be in constant communication with the wireless network 100. For example, the electronic device 106 may be an autonomous security vehicle (ASV), a laptop or tablet carried by a user.

In order to improve power consumption by a system of wireless access points 102, idle wireless access points 102 may be commanded to enter a sleep state 110 or a reduced power setting. Idle wireless access points 102 may be wireless access points 102 that are not within proximity of the electronic device 106. The wireless access points 102 may be powered by batteries and the reduced power setting minimizes the "on" time of the wireless access points 102 and reduces the amount of power being consumed by the wireless access points 102. Furthermore, wireless access points 102 may be powered by an electrical connection (e.g., wired connection) and the reduced power setting reduces the electricity cost for the wireless access points 102.

A wireless access point 102 may include a state determination module 108. The state determination module 108 may determine if the wireless access point 102 should be in an active state 112 or the sleep state 110. During the active state 112, the wireless access point 102 may have full power and communication ability with the electronic device 106. The electronic device 106 may be able to communicate with the wireless network 100 while within proximity of the wireless access point 102 during the active state 112. During the active state 112, the wireless access point 102 may have all of its internal components powered on and in an operational state.

During the sleep state 110, the wireless access point 102 may consume less power and may not be able to communicate while the wireless access point 102 is in the sleep state 110. During the sleep state 110, the wireless access point 102 may have most of its internal components powered off to achieve a reduction in power consumption.

The state determination module 108 may also be programmed with a sleep period 114. During a sleep period 114, the state determination module 108 may know how long to stay in the sleep state 110. In one configuration, the sleep period 114 may be a preprogrammed setting. For example, the electronic device 106 may be travelling within the wireless network 100 in a circular pattern at a set speed. The electronic device 106 may take a set amount of time to be back in the proximity of the wireless access point 102. In another configuration, the sleep period 114 may be a setting received from the central controller 104.

In one example, the central controller 104 may monitor the speed of the electronic device 106 and use that speed to determine a minimal amount of time before the electronic device 106 may be within range of the wireless access point 102 again. The speed at which the electronic device 106 can travel through the wireless network 100 may be based on how the wireless network 100 is used. For example, if the electronic device 106 is an autonomous vehicle the central controller 104 may be programmed with the maximum speed of the autonomous vehicle. If the wireless network 100 is a public network used by people, the central controller 104 may be programmed with an average walking or running speed of a human being. The central controller 104 may also be programmed with possible transit routes that the electronic device 106 may use. For example, the central controller 104 may know there is a fence that blocks a particular path that may increase the time it takes the electronic device 106 to travel from one wireless access point 102 to another.

The central controller 104 may be located within the wireless network 100. In one configuration, the central controller 104 may be located approximately in the center of the wireless network 100. In another configuration, 104, the central controller 104 may be located anywhere within the wireless network 100.

The central controller 104 may be connected to the one or more wireless access points 102. The central controller 104 may be connected to the one or more wireless access points 102 via a wire or wireless connection.

The central controller 104 may transmit data to one or more wireless access points 102 indicating which state the one or more wireless access points 102 should be in. In one configuration, the central controller 104 may include an access point location module 116, an electronic device movement module 118, a distant access point determination module 120 and an access point state module 122. The central controller 104 may determine which wireless access points 102 should be in an active state 112 and which wireless access points 102 should be in a sleep state 110. The access point location module 116 may be used to determine the physical location of the one or more wireless access points 102 located within the wireless network 100. The access point location module may use GPS data or preprogrammed data indicating the location of the wireless access points. The access point location module 116 may also use one or more wireless access points 102 and a triangulation method to determine the location of the wireless access points 102 located within the wireless network 100.

The electronic device movement module 118 may determine the location and speed of the electronic device 106 within the wireless network. The electronic device movement module 118 may use preprogrammed data, GPS data or movement update data sent by the electronic device 106 to determine the speed and location of the electronic device 106. The speed at which the electronic device 106 is travelling through the wireless network 100 and the current physical location of the electronic device 106 may be collected by the electronic device movement module 118.

The distant access point determination module 120 may use the movement of the electronic device 106 to determine which wireless access points 102 in the wireless network are distant wireless access points 102 and which are near wireless access points 102. In other words, a wireless access point 102 may be a near wireless access point 102 or a distant wireless access point 102 at different points in time depending on the movement of the electronic device 106. For example, the electronic device 106 may be moving within the wireless network 100 and may be exiting the proximity of a wireless access point 102. The distant access point determination module 120 may then determine that the wireless access point 102 is a distant wireless access point 102 since the electronic device may not be within the proximity of the wireless access point 102.

The access point state module 122 may generate a sleep state command 124 and/or an active state command 126 to send to the one or more wireless access points 102. The distant wireless access points 102 may receive a sleep state command 124 and may enter the sleep state 110. The near wireless access points may receive an active state command 126. The active state command 126 and sleep state command 124 may be generated by the access point state module 122 and transmitted to the corresponding wireless access points 102.

The systems and methods disclosed herein may reduce the power consumption of a wireless network 100. In particular, the power consumption of one or more wireless access points 102 may be reduced. A reduction in power consumption may extend the amount of time in-between maintenance of a battery powered wireless access point 102. For example, there may only be one electronic device 106 located within the wireless network 100. If there are several battery powered wireless access points 102 within the wireless network 100 powered on, distant wireless access points 102 will not be powered on, extending the life of the battery.

A battery powered wireless access point 102 may also have more power available when it is needed to communicate with the electronic device 106. The reduction in power may be achieved by powering down the different radios located within the wireless access point 102. If the wireless access points 102 are battery powered that may reduce the cost of building a wireless network 100 since there are no cables to install or maintain. However, benefits may be achieved even for wireless access points 102 that are connected to an electrical system (e.g., utility) by reducing electricity consumption.

Figure 2:
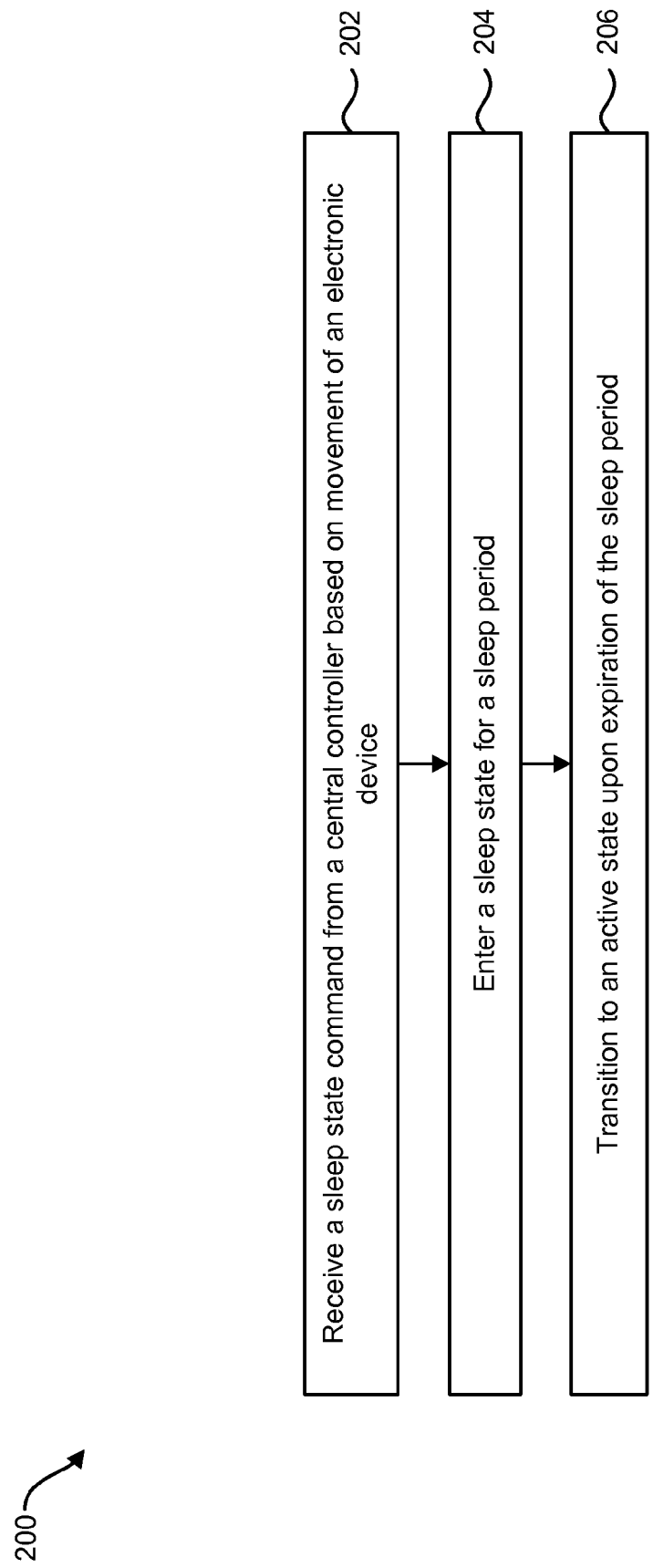
FIG. 2 is a flow diagram illustrating a method for wireless power management by wireless access point.

FIG. 2 is a flow diagram illustrating a method 200 for wireless power management by wireless access point 102. In one configuration the wireless access point 102 may be battery powered. In another configuration, the wireless access point 102 may be in a fixed location within the wireless network 100. The wireless access point 102 may be one of several wireless access points 102 in the wireless network 100. The method 200 may be implemented by a wireless access point 102 in one or more of these configurations.

The wireless access point 102 may receive 202 a sleep state command 124 from a central controller 104. The sleep state command 124 may be based on movement of an electronic device 106. For example, the electronic device 106 may be mobile and leaving the proximity of the wireless access point 102. To conserve energy when the electronic device 106 is out of the proximity, the wireless access point 102 may receive the sleep state command 124.

Upon receiving the sleep state command 124, the wireless access point 102 may enter 204 a sleep state 110 for a sleep period 114. The sleep state 110 may be a minimal power consumption state. During the sleep state 110, certain components of the wireless access point 102 may be powered off. In one configuration, the sleep period 114 may be a preprogrammed amount of time that the wireless access point 102 may be in the sleep state 110. In another configuration, the sleep period 114 may be based on the movement of the electronic device 106 within the wireless network 100. In other words, the sleep period 114 may vary depending on the speed and location of the electronic device 106. For example, the sleep period 114 may be short if the wireless access point 102 is near the electronic device 106 but the electronic device 106 is still not within communication range with the wireless access point 102. The sleep period 114 may be longer if the wireless access point 102 is far from the electronic device 106.

Upon expiration of the sleep period 114, the wireless access point 102 may check for an active state command 126. If the wireless access point 102 receives the active state command 126, it may transition 206 to an active state 112. During the active state 112, the wireless access point 102 may have most or all of its internal components powered on and in an operational state. When the wireless access point 102 is in the active state 112 the wireless access point 102 may be able to transmit and receive data between the wireless access point 102 and the electronic device 106. If the wireless access point 102 does not receive the active state command 126, the wireless access point 102 may re-enter the sleep state 110 for the sleep period 114.

Figure 3:
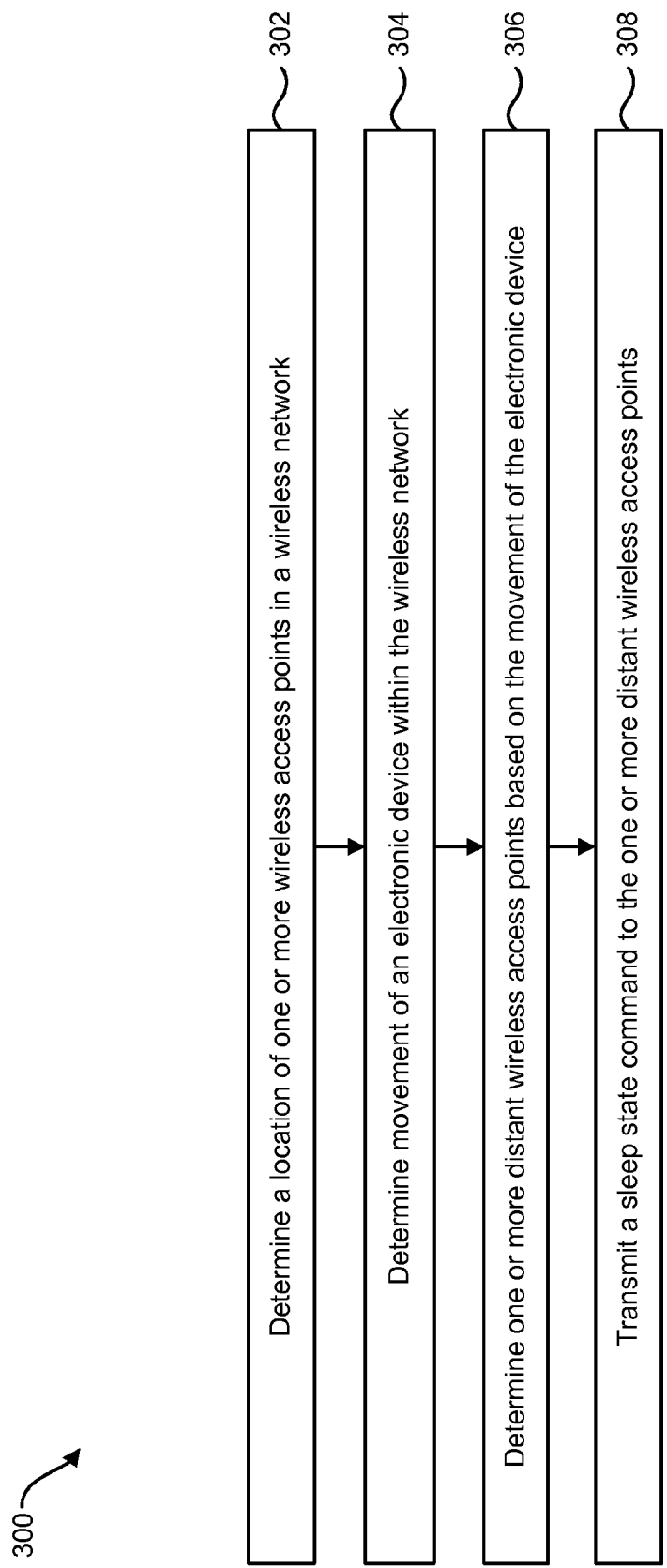
FIG. 3 is a flow diagram illustrating a method for wireless power management by a central controller.

FIG. 3 is a flow diagram illustrating a method 300 for wireless power management by a central controller 104. The central controller 104 may communicate with one or more wireless access points 102 to reduce power consumption of the wireless access point 102 based on movement of an electronic device 106.

The central controller 104 may determine 302 a location of one or more wireless access points 102 in a wireless network 100. For example, the location of the one or more wireless access points 102 may be the distance of the one or more wireless access points 102 from the central controller 104, the physical location of the one or more wireless access points 102 or the floor or building section that the one or more wireless access points 102 are located within.

The central controller 104 may determine 304 movement of the electronic device 106 within the wireless network. The movement of the electronic device 106 may be based on the location and speed at which the electronic device 106 is travelling through the wireless network 100. In one example, the electronic device 106 may be an ASV that is travelling in a preprogrammed route. For instance the preprogrammed route may follow a circular pattern throughout a corporate campus. The central controller 104 may determine the location and speed of the ASV based on the preprogrammed route of the ASV. In another example, the central controller 104 may be in direct communication with the electronic device 106 through the wireless network 100. The central controller 104 may collect real time global positioning (GPS) data of the location and speed of the ASV. In yet another example, the central controller 104 may determine 304 the movement of the electronic device 106 based on which wireless access points 102 the electronic device 106 is connected to and when the connections are established and broken.

The movement of the electronic device 106 and the location of the one or more wireless access points 102 in the wireless network may be used by the central controller 104 to determine 306 one or more distant wireless access points 102 within the wireless network 100. A distant wireless access point 102 may be a wireless access point 102 that is not in the proximity of the electronic device 106. The distant wireless access point 102 may not currently be used to connect the electronic device 106 to the wireless network 100. For example, a wireless access point 102 may be communicating with an ASV as the ASV traverses through the wireless network 100 in a circular pattern. As the ASV moves, it may enter the proximity of a wireless access point 102 and then exit the proximity of the wireless access point 102. The central controller 104 may determine that the wireless access point 102 is a distant wireless access point 102 once the ASV has exited the proximity of the wireless access point 102. This determination is based on the location of the wireless access point 102 and the movement of the ASV.

The central controller 104 may transmit 308 a sleep state command 124 to the one or more distant wireless access points 102. During a sleep state 110, the wireless access point 102 may have most of its internal components powered off to reduce power consumption. When the wireless access point 102 is in the sleep state 110, the wireless access point 102 may not be able to transmit and receive data between the wireless access point 102 and the electronic device 106 until the wireless access point 102 exits sleep state 110 and enters an active state 112.

Figure 4:
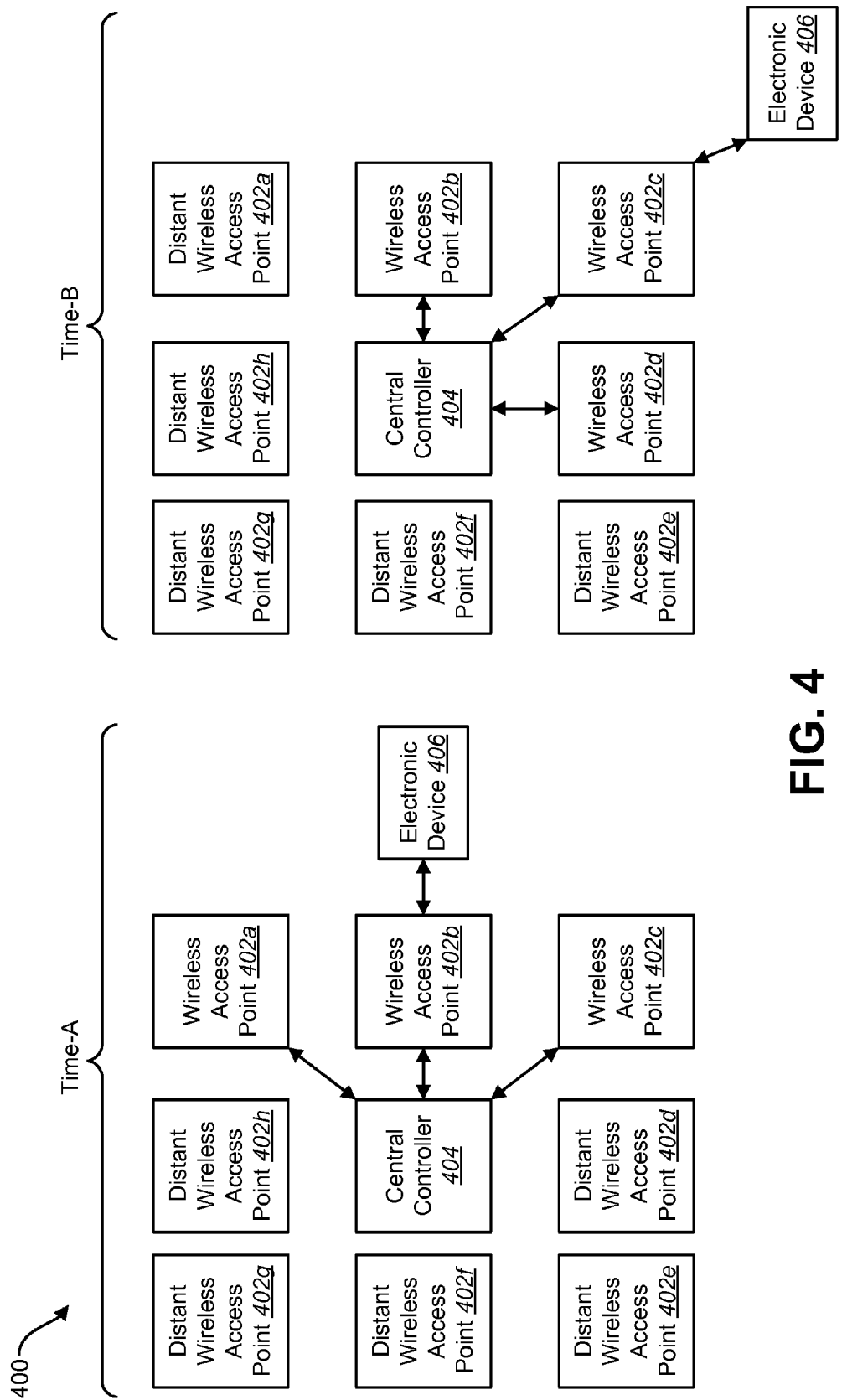
FIG. 4 is a block diagram illustrating a configuration of a wireless network at two different points in time.

FIG. 4 is a block diagram illustrating a configuration of a wireless network 400 at two different points in time. The wireless network 400 includes a central controller 404, multiple wireless access points 402a-h and an electronic device 406. In this configuration, the electronic device 406 is mobile and may move throughout the coverage areas of the wireless access points 402a-h.

At (or before) time-A, the central controller 404 may determine the location of the wireless access points 402a-h. The central controller 404 may then determine the movement of the electronic device 406. The movement of the electronic device 406 may be based on the location and speed of the electronic device 406.

The central controller 404 may determine which wireless access points 402 are near the electronic device 406 and which wireless access points 402 are distant wireless access points 402d-h. This determination may be made using the location of the wireless access points 402a-h and the movement of the electronic device 406. At time-A, the central controller 404 determines that the electronic device 406 is within proximity of three wireless access points 402a-c. The five remaining wireless access points 402d-h are distant wireless access points 402d-h.

The central controller 404 may transmit an active state command 126 to the three wireless access points 402a-c that are near the electronic device 406 to provide wireless connectivity to the electronic device 406. The central controller 404 may transmit a sleep state command 124 to the five distant wireless access points 402d-h in the wireless network 400. By having the five distant wireless access points 402d-h enter a sleep state 110, less power may be consumed by the distant wireless access points 402d-h.

At time-B, the central controller 404 may determine the new location of the electronic device 406. In this example, the location of the electronic device 406 changed from time-A to time-B, but the location of the wireless access points 402a-h did not change. Based on the new location of the electronic device 406, the central controller 404 may determine if any wireless access points 402a-h need to change from either the active state 112 to the sleep state 110 or vice versa.

At time-B, the electronic device 406 is still within proximity of wireless access points 402b, c. However, the electronic device 406 exited the proximity of wireless access point 402a and may have entered the proximity of wireless access point 402*d*. Therefore, at time-B, the wireless access points 402 near the electronic device 406 are wireless access points 402*b-d* and the distant wireless access points 402 are wireless access points 402*a*, 402*e-h*.

The central controller 404 may transmit an active state command 126 to the three wireless access points 402*b-d* near the electronic device 406. A sleep state command 124 may be transmitted by the central controller 404 to the distant wireless access points 402*a*, 402*e-h*

It should be noted that because wireless access points 402*b, c* were already in an active state 112, there may be no change in the operation of these two wireless access points 402*b, c*. Similarly, because wireless access points 402*e-h* were already in a sleep state 110, there may be no change in the operation of these wireless access points 402*e-h*. However, wireless access point 402*a* transitions from an active state 112 to a sleep state 110 and may power off any transmitting or receiving radios and enter the sleep state 110 for a sleep period 114. Wireless access point 402*d* transitions from a sleep state 110 to an active state 112. The radios within wireless access point 402*d* may be powered on and the wireless access point 402*d* may start transmitting to and receiving data from the electronic device 406.

Figure 5:
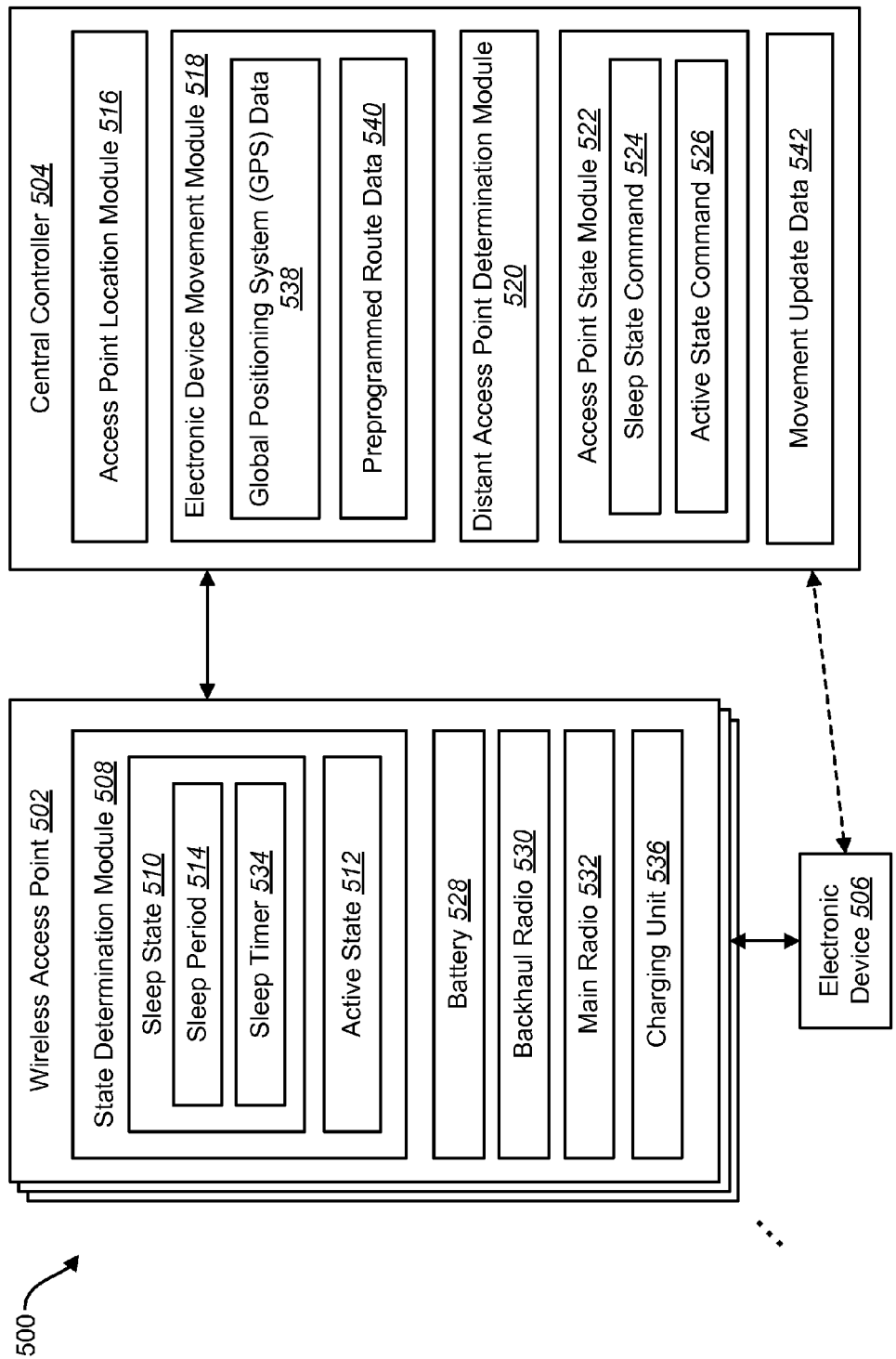
FIG. 5 is a block diagram of another configuration of a wireless access point, a central controller, an electronic device and a charging unit.

FIG. 5 is a block diagram illustrating a detailed configuration of a wireless network 500 for performing wireless power management. The wireless network 500 may include one or more wireless access points 502, a central controller 504 and an electronic device 506. The one or more wireless access points 502, central controller 504 and the electronic device 506 described in connection with FIG. 5 may be implemented in accordance with the one or more wireless access points 102, central controller 104 and the electronic device 106 described in connection with FIG. 1.

The wireless access point 502 may include a state determination module 508. The state determination module 508 may determine if the wireless access point 502 should be in an active state 512 or the sleep state 510. This may be accomplished as described above in connection with FIG. 1.

The wireless access point 502 may include a battery 528 used to provide power to the wireless access point 502. The battery 528 may be a rechargeable or non-rechargeable battery. For example, the battery 528 may be a lithium-ion battery, alkaline battery or a lead acid battery.

In one configuration, the wireless access point 502 may include a charging unit 536 to recharge the battery 528. The charging unit 536 may generate power through different methods. For example, the charging unit 536 may be a solar panel, hydroelectric generator or a nuclear reactor. The power generated by the charging unit 536 may power the wireless access point 502 during remote operation with minimal maintenance. For example, the wireless access point 502 may not be connected via wires to other components in the wireless network 500. In another configuration, the charging unit 536 may be separate from the wireless access point 502.

The main radio 532 may be used to transmit and receive data between the wireless access point 502 and the electronic device 506. Commands from the central controller 504 may be received by the wireless access point 502 through the backhaul radio 530. For example, the backhaul radio 530 may receive commands through the Internet, other servers, and/or the central controller 504. For another example, the wireless access point 502 may receive a sleep state command 524 from the central controller 504 through the backhaul radio 530 when the wireless access point 502 is either in an active state 512 or checking for new commands. The backhaul radio 530 may be used when there is no cable connected to the wireless access point 502 to provide wired backhaul connectivity. In another configuration, the wireless access point 502 may include a wired backhaul connection to the wireless network 500 in addition to or instead of a backhaul radio 530. In this configuration, the wireless access point 502 may receive a backhaul signal that includes the active state command 526 or sleep state command 524.

The sleep timer 534 may be used to determine how long the wireless access point 502 is in the sleep state 510. The length of time the wireless access point 502 is in the sleep state 510 may also be determined by a preprogrammed sleep period 514. For example, the wireless access point 502 may enter the sleep state for the sleep period 514. After the sleep period 514 expires, the wireless access point 502 may check for new commands from the central controller 504. The wireless access point 502 may not receive an active state command 526. Instead, the wireless access point 502 may receive a sleep state command 524 that indicates a length of time for the sleep timer 534 to keep the wireless access point 502 in the sleep state 510.

The central controller 504 may determine which wireless access points 502 should be in the active state 512 and which wireless access points 502 should be in the sleep state 510. The central controller 504 may include an access point location module 516. The access point location module 516 may be used to determine the physical location of the one or more wireless access points 502 located within the wireless network 500.

The central controller 504 may use an electronic device movement module 518. The electronic device movement module 518 may determine the location and speed of the electronic device 506 within the wireless network 500. The speed at which the electronic device 506 is travelling through the wireless network 500 and the current physical location of the electronic device 506 may be determined by the electronic device movement module 518. In one configuration, the central controller 504 may obtain global positioning system (GPS) data 538 of the electronic device 506. The GPS data 538 may be used by the electronic device movement module 518 to determine the location and speed of the electronic device 506. The central controller 504 may also include preprogrammed route data 540 of the electronic device 506. The preprogrammed route data 540 may be used by the electronic device movement module 518 to determine the location and speed of the electronic device 506.

A distant access point determination module 520 may be included in the central controller 504. The distant access point determination module 520 may use the movement of the electronic device 506 to determine which wireless access points 502 in the wireless network are distant wireless access points 502 and which are near wireless access points 502.

In one configuration, the central controller 504 may use movement update data 542 sent by the electronic device to assist in determining distant wireless access points 502. For example, the electronic device 506 may initially be moving in a preprogrammed route. The electronic device 506 may determine that the preprogrammed route needs to be altered due to data the electronic device 506 has collected. The electronic device 506 may then send the movement update data 542 to the wireless access point 502 indicating the new route the electronic device 506 is going to take. Alternatively, a user may provide movement update data 542 indicating the intended route of the electronic device 506. Therefore, users may interact with the central controller 504 by providing information on their intended movements. The central controller 504 may use the movement update data 542 to command only the bare minimum number of wireless access points 502 to be in an active state 512 at a given instant.

The distant wireless access points 502 may receive a sleep state command 524 and may enter the sleep state 510. The near wireless access points 502 may receive an active state command 526. The active state command 526 and sleep state command 524 may be transmitted by an access point state module 522.

The electronic device 506 may be any electronic device 506 capable of wireless communication. In one configuration, the electronic device 506 may be stationary and only needing access to the wireless network periodically. In another configuration the electronic device 506 may be a mobile device that may be in constant communication with the wireless network.

In another configuration, the wireless network 500 may not include a central controller 504. Instead, each wireless access point 502 in the wireless network 500 would sleep for a fixed amount of time (e.g., sleep period 514). At the end of the sleep period 514, all wireless access points 502 would go active (e.g., enter an active state 512) for a short amount of time, bringing the wireless network 500 online. Users (e.g., one or more electronic devices 506) of this wireless network 500 would also be aware of the sleep/active timing of this wireless network 500. The users may join the wireless network 500 during the active state 512 period in order to use the wireless network 500. The users may go to sleep (or disconnect from the wireless network 500) during the sleep period 510 of the wireless network 500.

A wireless network 500 that has periodic active remote access points could be used in remote areas where providing power and data connectivity is extremely cost prohibitive, but having periodic data connectivity could prove useful.

Figure 6:
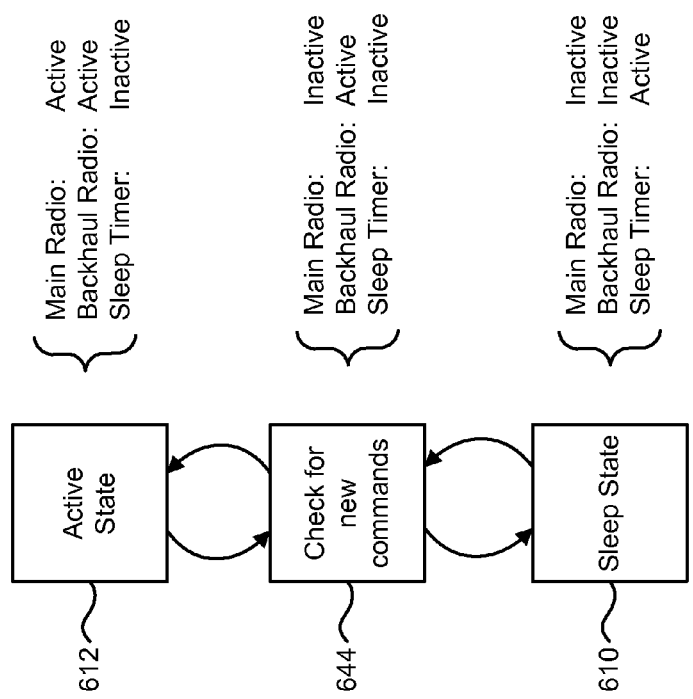
FIG. 6 is a state diagram illustrating a configuration of an active state, checking for new commands and a sleep state of a wireless access point.

FIG. 6 is a state diagram illustrating a configuration of an active state 612, checking 644 for new commands and a sleep state 610 of a wireless access point 502. The state blocks 610, 612 and 644 are a detailed description of the configuration of the wireless access point 502 during the active state 612, checking 644 for new commands and the sleep state 610 described above in connection with FIG. 1, FIG. 2, FIG. 4 and FIG. 5.

The wireless access point 502 may include a main radio 532, a backhaul radio 530 and a sleep timer 534. The main radio 532 may be used to transmit and receive data between the wireless access point 502 and an electronic device 506. Commands from a central controller 504 may be received by the backhaul radio 530 and transmitted using the backhaul radio 530. The wireless access point 502 may be in different states at different points in time. The sleep timer 534 may be used to determine how long the wireless access point 502 may be in the sleep state 510.

In the active state 612, the wireless access point 502 may have full communication ability. The main radio 532 and backhaul radio 530 may be active and the sleep timer 534 inactive. For example, when the main radio 532 is active, the main radio 532 may have most or all of its internal components powered on. The wireless access point 502 may check for new commands being transmitted by the central controller 504 while in the active state 512. The wireless access point 502 may constantly or periodically check for new commands while in the active state 612.

In the sleep state 610, the main radio 532 and the backhaul radio 530 may be inactive and the sleep timer 534 may be active. With the main radio 532 and backhaul radio 530 inactive, the power consumption of the wireless access point 502 may be significantly reduced. When the main radio 532 is inactive, the wireless access point 502 may not be able to transmit or receive data between the wireless access point 502 and the electronic device 506. Furthermore, when the main radio 532 is inactive, the main radio 532 may have some or all of its internal components powered off. The processing power of the wireless access point 502 may be significantly reduced while the wireless access point is in the sleep state 610.

When the wireless access point 502 checks 644 for new commands, the wireless access point 502 may just be exiting the sleep state 610 (e.g., upon expiration of the sleep timer 534). The main radio 532 and sleep timer 534 are inactive while the backhaul radio 530 is active. This may be done so the wireless access point 502 may receive an active state command 526 through the backhaul radio 530.

Figure 7:
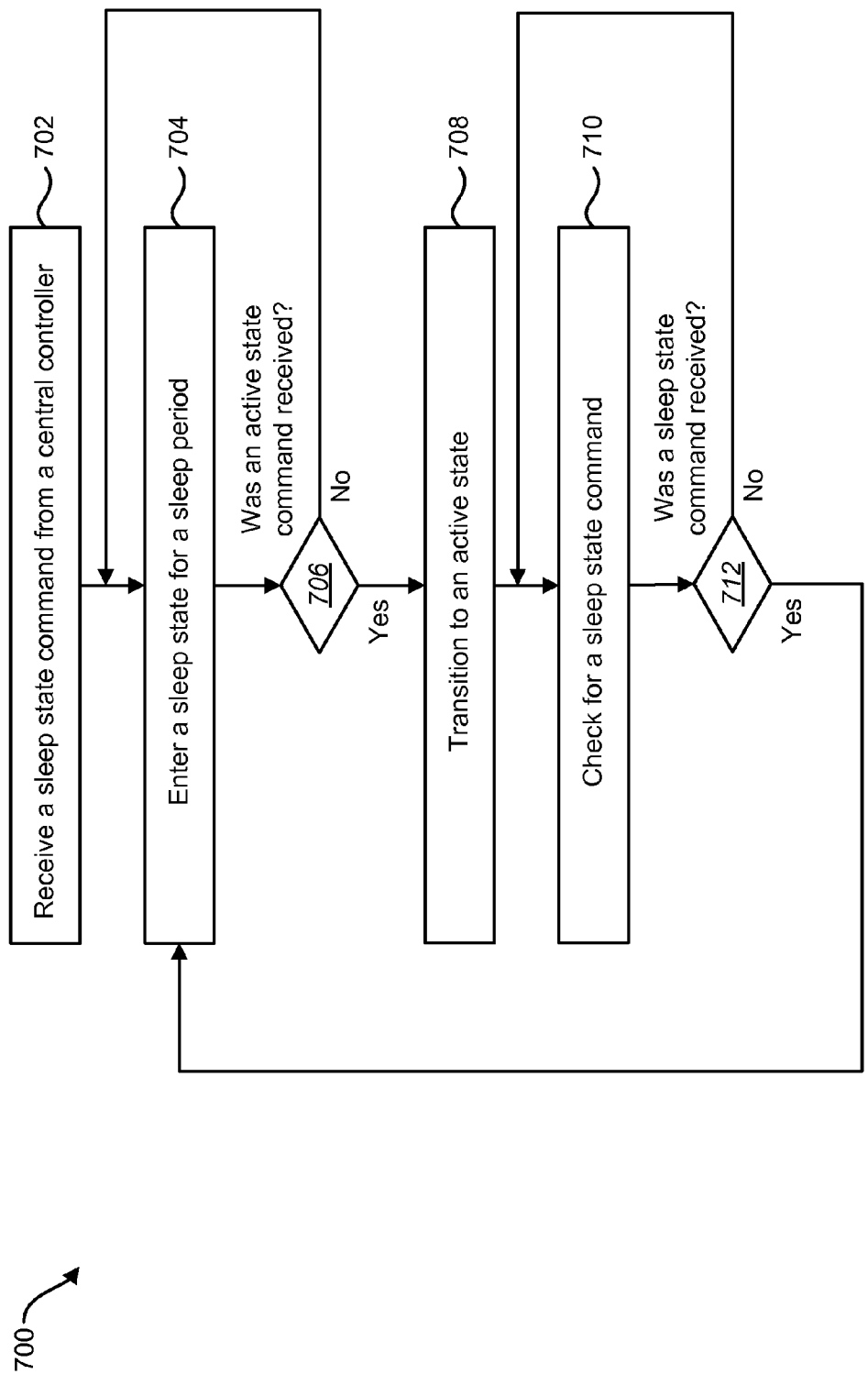
FIG. 7 is a flow diagram illustrating a detailed method for wireless power management by a wireless access point.

FIG. 7 is a flow diagram illustrating a detailed method 700 for wireless power management by a wireless access point. The wireless access point 502 may receive 702 a sleep state command 524 from a central controller 504. The sending of the sleep state command 524 may be based on the movement of an electronic device 506. Once the wireless access point 502 receives a sleep state command 524, the wireless access point 502 may enter 704 a sleep state 510 for a sleep period 514. If the wireless access point 502 enters the sleep state 510, it may also use a sleep timer 534 to determine how long to remain in the sleep state 510. While in the sleep state 510, the wireless access point 502 may reduce power consumption and increase the length of time a battery 528 may be able to provide power for the wireless access point 502.

Upon expiration of the sleep period 514, the wireless access point 502 may determine 706 whether an active state command 526 was received. For example, the wireless access point 502 may activate a backhaul radio 530 to check for an active state command 526 from the central controller 504. If the active state command 526 is not received, then the wireless access point 502 may enter 704 the sleep state 510 again for the sleep period 514.

If the wireless access point 502 determines 706 that the active state command 526 was received, then the wireless access point 502 may transition 708 to an active state 512. When the wireless access point 502 enters the active state 512, the wireless access point's 502 main radio 532 may be powered on. The main radio 532 may be used to transmit and receive data between the wireless access point 502 and the electronic device 506. The wireless access point 502 may also have a backhaul radio 530 powered on. The backhaul radio 530 may be used to receive and send commands between the wireless access point 502 and the central controller 504.

While in the active state 512, the wireless access point 502 may check 710 for the sleep state command 524. If the wireless access point 502 determines 712 the sleep state command 524 was not received, then the wireless access point 502 may check 710 again for the sleep state command 524. The wireless access point 502 may wait a period of time or constantly check for the sleep state command 524. However, if the wireless access point 502 determines 712 that the sleep state command 524 was received, then the wireless access point 502 may enter 704 the sleep state 510 for the sleep period 514.

Figure 8:
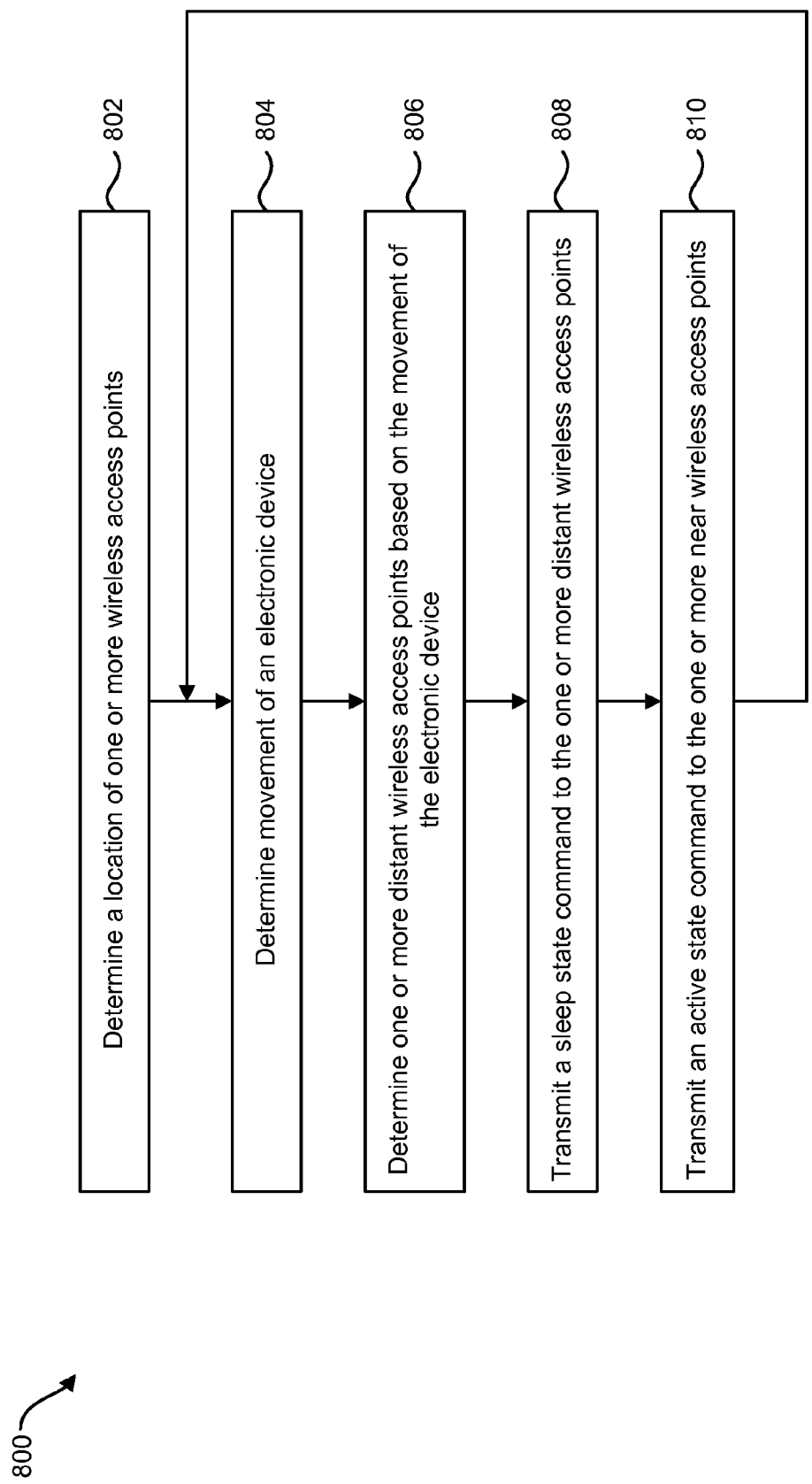
FIG. 8 is a flow diagram illustrating a detailed method for wireless power management by a central controller.

FIG. 8 is a flow diagram illustrating a detailed method 800 for wireless power management by a central controller 504. The central controller 504 may determine 802 a location of one or more wireless access points 502 within a wireless network 500. For example, the location of the one or more wireless access points 502 may be the distance of the one or more wireless access points 502 from the central controller 504, the physical location of the one or more wireless access points 502 or the floor or building section that the one or more wireless access points 502 are located within.

The movement of an electronic device 506 within the wireless network 500 may then be determined 804 by the central controller 504. The speed at which the electronic device 506 is travelling within the wireless network 500 and the physical location of the electronic device 506 within the wireless network 500 may be used to determine the movement of the electronic device 506.

The central controller 504 may determine 806 one or more distant wireless access points 502 within the wireless network 500. The movement of the electronic device 506 and the location of the one or more wireless access points 502 within the wireless network may be used by the central controller 504 to determine 806 the one or more distant wireless access points 502. For example, the central controller 504 may use the movement of the electronic device 506 within the wireless network 500 and the location of the one or more wireless access points 502 to determine that the electronic device 506 is not within proximity of the distant wireless access points 502.

The central controller 504 may transmit 808 a sleep state command 524 from an access point state module 522 to the one or more distant wireless access points 502. For example, the central controller 504 may use the movement of the electronic device 506 and the location of the one or more wireless access points 502 within the wireless network 500 to determine the one or more wireless access points 502 that the electronic device 506 is not within proximity of. The central controller 504 may transmit 808 the sleep state command 524 to these distant wireless access points 502.

If the central controller 504 transmits the sleep state command 524 to the distant wireless access points 102, then the wireless access point 502 may transition to a sleep state 510. When the wireless access point 502 enters the sleep state 510, the wireless access point's 502 main radio 532 may be powered off and cannot communicate with the electronic device 506. The wireless access point 502 may also power off a backhaul radio 530. New commands transmitted by the central controller 504 when the backhaul radio 530 is off may not be received by the distant wireless access points 502.

The central controller 504 may transmit 810 an active state command 526 from the access point state module 522 to the one or more wireless access points 502 that were determined to be near wireless access points 502 (e.g., wireless access points 502 that are in proximity of the electronic device 506). For example, the central controller 504 may use the movement of the electronic device 506 within the wireless network and the location of the one or more wireless access points 502 within the wireless network to determine the one or more wireless access points 502 that determine the one or more near wireless access points 502 that are within proximity of the electronic device 506.

If the central controller 504 transmits the active state command 526 to the distant wireless access points 502, then the wireless access point 502 may transition to an active state 512. When the wireless access point 502 enters the active state 512, the wireless access point's 502 main radio 532 may be powered on. The main radio 532 may be used to transmit and receive data between the wireless access point 502 and the electronic device 506. The wireless access point 502 may also have a backhaul radio 530 powered on.

The backhaul radio 530 may be used to receive and send commands between the wireless access point 502 and the central controller 504.

Figure 9:
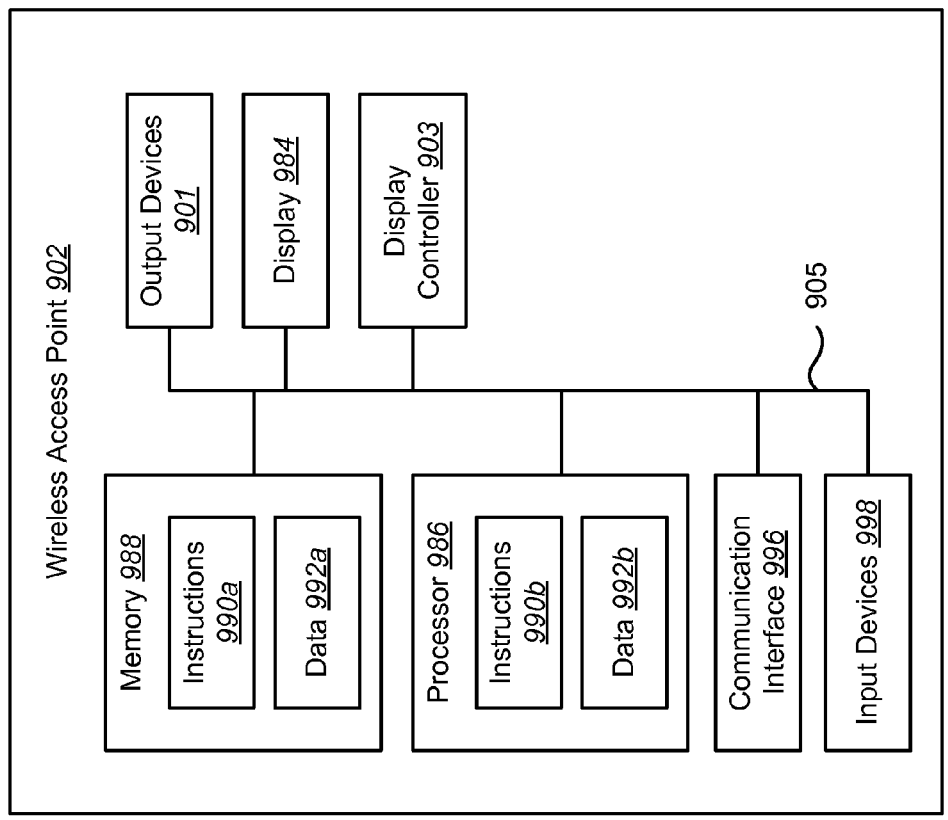
FIG. 9 illustrates various components that may be utilized in a wireless access point.

FIG. 9 illustrates various components that may be utilized in a wireless access point 902. The wireless access point 902 may be utilized as the wireless access point 102, 402 and 502 illustrated previously. The wireless access point 902 includes a processor 986 that controls operation of the wireless access point 902. The processor 986 may also be referred to as a CPU. Memory 988, which may include both read-only memory (ROM), random access memory (RAM) or any type of device that may store information, provides instructions 990a and data 992a to the processor 986. A portion of the memory 988 may also include non-volatile random access memory (NVRAM). Instructions 990b and data 992b may also reside in the processor 986. Instructions 990b and/or data 992b loaded into the processor 986 may also include instructions 990a and/or data 992a from memory 988 that were loaded for execution or processing by the processor 986. The instructions 990b may be executed by the processor 986 to implement the systems and methods disclosed herein.

The wireless access point 902 may include one or more communication interfaces 996 for communicating with other electronic devices. The communication interfaces 996 may be based on wired communication technology, wireless communication technology, or both. Examples of communication interfaces 996 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The wireless access point 902 may include one or more output devices 901 and one or more input devices 998. Examples of output devices 901 include a speaker, printer, etc. One type of output device that may be included in a wireless access point 902 is a display device 984. Display devices 984 used with configurations disclosed herein may utilize any suitable image projection technology, such as a cathode ray tube (CRT), liquid crystal display (LCD), light-emitting diode (LED), gas plasma, electroluminescence or the like. A display controller 903 may be provided for converting data stored in the memory 988 into text, graphics and/or moving images (as appropriate) shown on the display 984. Examples of input devices 998 include a keyboard, mouse, microphone, remote control device, button, joystick, trackball, touchpad, touchscreen, lightpen, etc.

The various components of the wireless access point 902 are coupled together by a bus system 905, which may include a power bus, a control signal bus and a status signal bus, in addition to a data bus. However, for the sake of clarity, the various buses are illustrated in FIG. 9 as the bus system 905. The wireless access point 902 illustrated in FIG. 9 is a functional block diagram rather than a listing of specific components.

Figure 10:
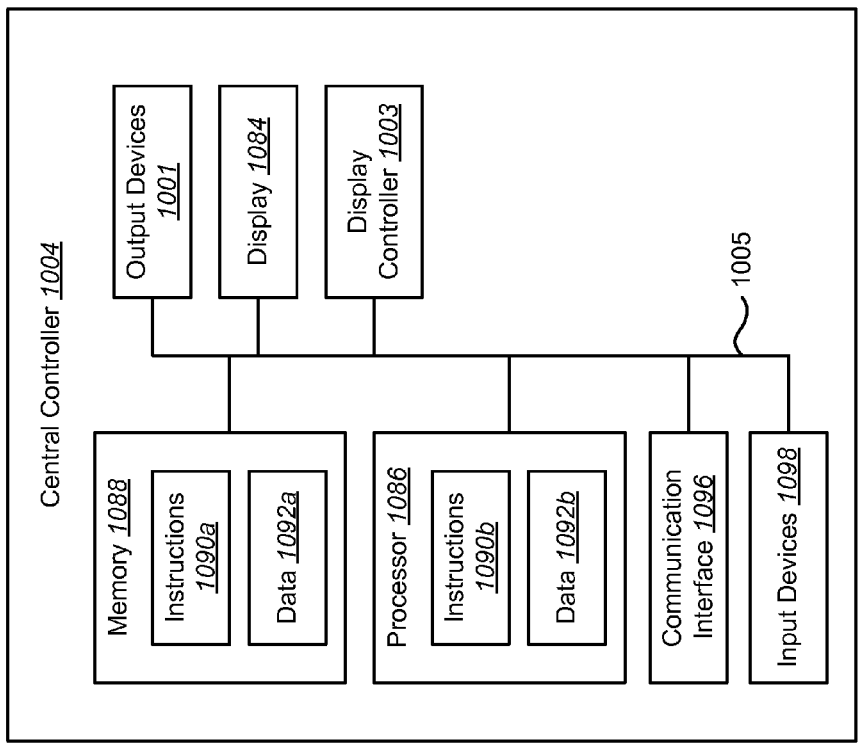
FIG. 10 illustrates various components that may be utilized in a central controller.

FIG. 10 illustrates various components that may be utilized in a central controller 1004. The central controller 1004 may be utilized as the central controller 104, 404 and 504 illustrated previously. The central controller 1004 includes a processor 1086 that controls operation of the central controller 1004. The processor 1086 may also be referred to as a CPU. Memory 1088, which may include both read-only memory (ROM), random access memory (RAM) or any type of device that may store information, provides instructions 1090a and data 1092a to the processor 1086. A portion of the memory 1088 may also include non-volatile random access memory (NVRAM). Instructions 1090b and data 1092b may also reside in the processor 1086. Instructions 1090b and/or data 1092b loaded into the processor 1086 may also include instructions 1090a and/or data 1092a from memory 1088 that were loaded for execution or processing by the processor 1086. The instructions 1090b may be executed by the processor 1086 to implement the systems and methods disclosed herein.

The central controller 1004 may include one or more communication interfaces 1096 for communicating with other electronic devices. The communication interfaces 1096 may be based on wired communication technology, wireless communication technology, or both. Examples of communication interfaces 1096 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The central controller 1004 may include one or more output devices 1001 and one or more input devices 1098. Examples of output devices 1001 include a speaker, printer, etc. One type of output device that may be included in a central controller 1004 is a display device 1084. Display devices 1084 used with configurations disclosed herein may utilize any suitable image projection technology, such as a cathode ray tube (CRT), liquid crystal display (LCD), light-emitting diode (LED), gas plasma, electroluminescence or the like. A display controller 1003 may be provided for converting data stored in the memory 1088 into text, graphics and/or moving images (as appropriate) shown on the display 1084. Examples of input devices 1098 include a keyboard, mouse, microphone, remote control device, button, joystick, trackball, touchpad, touchscreen, lightpen, etc.

The various components of the central controller 1004 are coupled together by a bus system 1005, which may include a power bus, a control signal bus and a status signal bus, in addition to a data bus. However, for the sake of clarity, the various buses are illustrated in FIG. 10 as the bus system 1005. The central controller 1004 illustrated in FIG. 10 is a functional block diagram rather than a listing of specific components.

Figure 11:
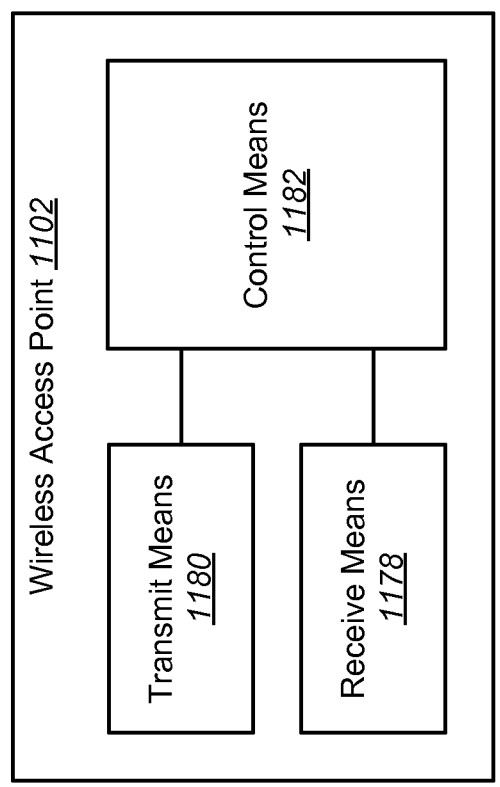
FIG. 11 is a block diagram illustrating one configuration of a wireless access point in which systems and methods for wireless power management may be implemented.

FIG. 11 is a block diagram illustrating one configuration of a wireless access point 1102 in which systems and methods for wireless power management may be implemented. The wireless access point 1102 includes transmit means 1180, receive means 1178 and control means 1182. The transmit means 1180, receive means 1178 and control means 1182 may be configured to perform one or more of the functions described in connection with FIG. 2, FIG. 6 and FIG. 7 above. FIG. 9 above illustrates one example of a concrete apparatus structure of FIG. 11. Other various structures may be implemented to realize one or more of the functions of FIG. 2, FIG. 6 and FIG. 7.

Figure 12:
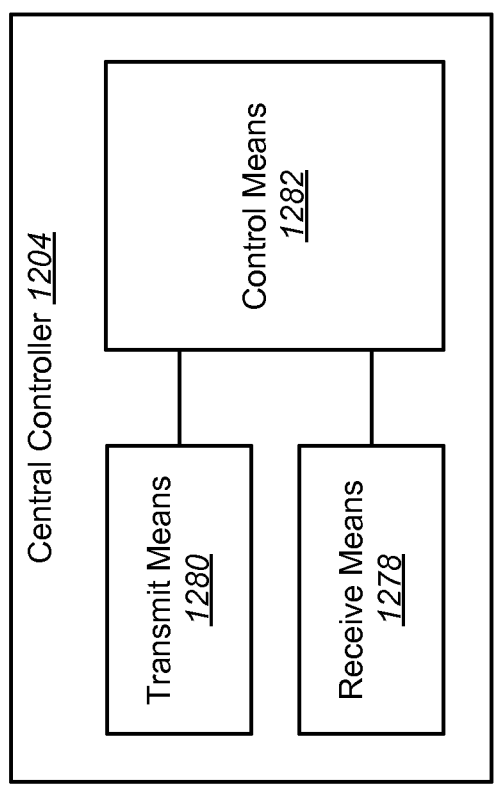
FIG. 12 is a block diagram illustrating one configuration of a central controller in which systems and methods for wireless power management may be implemented.

FIG. 12 is a block diagram illustrating one configuration of a central controller 1204 in which systems and methods for wireless power management may be implemented. The central controller 1204 includes transmit means 1280, receive means 1278 and control means 1282. The transmit means 1280, receive means 1278 and control means 1282 may be configured to perform one or more of the functions described in connection with FIG. 3 and FIG. 8 above. FIG. 10 above illustrates one example of a concrete apparatus structure of FIG. 12. Other various structures may be implemented to realize one or more of the functions of FIG. 3 and FIG. 8.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, Electrically Erasable Programmable Read-Only Memory (EEPROM), Compact Disc Read-Only Memory (CD-ROM) or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless access point, comprising:
a processor; and
memory in electronic communication with the processor, wherein instructions stored in the memory are executable to:
receive a sleep state command from a central controller, wherein the central controller transmits the sleep state command based on a minimum amount of time before which an autonomous vehicle could be within range of the wireless access point, wherein the minimum amount of time is determined based on a maximum speed of the autonomous vehicle and possible transit routes of the autonomous vehicle;
enter a sleep state for a sleep period; and
transition to an active state upon expiration of the sleep period.

2. The wireless access point of claim 1, further comprising instructions executable to:
check for an active state command, upon expiration of the sleep period, wherein the active state command instructs the wireless access point to transition to the active state.

3. The wireless access point of claim 2, further comprising instructions executable to:
activate a backhaul radio; and
check for the active state command, wherein if the active state command is received, the wireless access point transitions to the active state.

4. The wireless access point of claim 2, further comprising instructions executable to:
  receive a backhaul signal that includes the active state command, wherein if the active state command is received, the wireless access point transitions to the active state.

5. The wireless access point of claim 1, wherein the movement of the autonomous vehicle is determined based on connections of the autonomous vehicle to one or more wireless access points in a wireless network.

6. The wireless access point of claim 1, wherein the movement of the autonomous vehicle is determined based on global positioning system (GPS) data.

7. The wireless access point of claim 1, wherein during the active state, a main radio is active, a backhaul radio is active and a sleep timer is inactive.

8. The wireless access point of claim 1, wherein during the sleep state, a main radio is inactive, a backhaul radio is inactive and a sleep timer is active.

9. The wireless access point of claim 1, wherein during the active state, a main radio is active and a sleep timer is inactive.

10. The wireless access point of claim 1, wherein during the sleep state, a main radio is inactive and a sleep timer is active.

11. The wireless access point of claim 1, further comprising a battery and a charging unit, wherein the charging unit comprises at least one of a solar panel, a hydroelectric generator, and a nuclear reactor.

12. A central controller, comprising:
  a processor; and
  memory in electronic communication with the processor, wherein instructions stored in the memory are executable to:
  determine a location of one or more wireless access points in a wireless network;
  receive movement update data from an autonomous vehicle;
  determine, for each of one or more wireless access points, a minimum amount of time before which the autonomous vehicle could be within range of the wireless access point based on a maximum speed of the autonomous vehicle and possible transit routes of the autonomous vehicle;
  determine one or more distant wireless access points based on the determined minimum amounts of time; and
  transmit a sleep state command to the one or more distant wireless access points.

13. The central controller of claim 12, further comprising instructions executable to:
  transmit an active state command to one or more near wireless access points based on the movement of the autonomous vehicle.

14. The central controller of claim 12, wherein the movement of the autonomous vehicle is determined based on connections of the autonomous vehicle to one or more wireless access points in the wireless network.

15. The central controller of claim 12, wherein the movement of the autonomous vehicle is determined based on global positioning system (GPS) data.

16. The central controller of claim 12, further comprising instructions executable to:
  determine the one or more distant wireless access points based on the location of the one or more wireless access points and the movement of the autonomous vehicle.

17. A method for power management by a wireless access point, comprising:
  receiving a sleep state command from a central controller, wherein the central controller transmits the sleep state command based on movement a minimum amount of time before which an autonomous vehicle could be within range of the wireless access point, wherein the minimum amount of time is determined based on a maximum speed of the autonomous vehicle and possible transit routes of the autonomous vehicle;
  entering a sleep state for a sleep period; and
  transitioning to an active state upon expiration of the sleep period.

18. The method of claim 17, further comprising checking for an active state command, upon expiration of the sleep period, wherein the active state command instructs the wireless access point to transition to the active state.

19. The method of claim 18, further comprising:
  activating a backhaul radio; and
  checking for the active state command, wherein if the active state command is received, the wireless access point transitions to the active state.

20. The method of claim 18, further comprising instructions executable to:
  receive a backhaul signal that includes the active state command, wherein if the active state command is received, the wireless access point transitions to the active state.

21. The method of claim 17, wherein the movement of the autonomous vehicle is determined based on connections of the autonomous vehicle to one or more wireless access points in a wireless network.

22. The method of claim 17, wherein the movement of the autonomous vehicle is determined based on global positioning system (GPS) data.

23. The method of claim 17, wherein during the active state, a main radio is active, a backhaul radio is active and a sleep timer is inactive.

24. The method of claim 17, wherein during the sleep state, a main radio is inactive, a backhaul radio is inactive and a sleep timer is active.

25. The method of claim 17, wherein during the active state, a main radio is active and a sleep timer is inactive.

26. The method of claim 17, wherein during the sleep state, a main radio is inactive and a sleep timer is active.

27. A method for power management by a central controller, comprising:
  determining a location of one or more wireless access points in a wireless network;
  receiving movement update data from an autonomous vehicle;
  determining, for each of one or more wireless access points, a minimum amount of time before which the autonomous vehicle could be within range the wireless access point based on a maximum speed of the autonomous vehicle and possible transit routes of the autonomous vehicle;
  determining one or more distant wireless access points based on the determined minimum amounts of time; and
  transmitting a sleep state command to one or more distant wireless access points.

28. The method of claim 27, further comprising:
  transmitting an active state command to one or more near wireless access points based on the movement of the autonomous vehicle.

29. The method of claim 27, wherein the movement of the autonomous vehicle is determined based on connections of the autonomous vehicle to one or more wireless access points in the wireless network.

30. The method of claim 27, wherein the movement of the autonomous vehicle is determined based on global positioning system (GPS) data.

31. The method of claim 27, further comprising:
   determining the one or more distant wireless access points based on the location of the one or more wireless access points and the movement of the autonomous vehicle.

\* \* \* \* \*

UNITED STATES PATENT AND TRADEMARK OFFICE
CERTIFICATE OF CORRECTION

PATENT NO. : 9,699,722 B2
APPLICATION NO. : 14/318484
DATED : July 4, 2017
INVENTOR(S) : Richard Eric Helvick et al.

Page 1 of 1

It is certified that error appears in the above-identified patent and that said Letters Patent is hereby corrected as shown below:

In the Claims

In Column 18, Line 5, please delete "movement".

Signed and Sealed this
Fifth Day of December, 2017

Joseph Matal
*Performing the Functions and Duties of the*
*Under Secretary of Commerce for Intellectual Property and*
*Director of the United States Patent and Trademark Office*